United States Patent
Yoo et al.

(10) Patent No.: US 9,210,605 B2
(45) Date of Patent: Dec. 8, 2015

(54) CHANNEL STATE INFORMATION REPORTING FOR PARTIALLY CANCELLED INTERFERENCE

(71) Applicant: QUALCOMM Incorporated, San Diego, CA (US)

(72) Inventors: Taesang Yoo, San Diego, CA (US); Tao Luo, San Diego, CA (US); Siddhartha Mallik, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 214 days.

(21) Appl. No.: 13/928,202

(22) Filed: Jun. 26, 2013

(65) Prior Publication Data
US 2014/0003267 A1 Jan. 2, 2014

Related U.S. Application Data

(60) Provisional application No. 61/666,673, filed on Jun. 29, 2012.

(51) Int. Cl.
| | |
|---|---|
| *H04W 4/00* | (2009.01) |
| *H04W 24/10* | (2009.01) |
| *H04L 1/00* | (2006.01) |
| *H04B 17/309* | (2015.01) |
| *H04B 7/06* | (2006.01) |
| *H04B 17/336* | (2015.01) |
| *H04B 7/04* | (2006.01) |
| *H04L 5/00* | (2006.01) |
| *H04B 17/24* | (2015.01) |
| *H04B 17/327* | (2015.01) |

(52) U.S. Cl.
CPC .............. *H04W 24/10* (2013.01); *H04B 7/0632* (2013.01); *H04B 17/309* (2015.01); *H04B 17/336* (2015.01); *H04L 1/0026* (2013.01); *H04B 7/0417* (2013.01); *H04B 17/24* (2015.01); *H04B 17/327* (2015.01); *H04L 5/0053* (2013.01); *H04L 5/0057* (2013.01); *H04L 5/0073* (2013.01); *H04L 5/0091* (2013.01)

(58) Field of Classification Search
CPC ..................................................... H04W 24/10
USPC ......................................................... 370/252
See application file for complete search history.

(56) References Cited

U.S. PATENT DOCUMENTS

| | | | |
|---|---|---|---|
| 7,856,243 B2 | 12/2010 | Gunnarsson et al. | |
| 8,295,395 B2 | 10/2012 | Mueck et al. | |
| 2010/0009705 A1* | 1/2010 | Budianu | H04L 1/1812 455/501 |
| 2010/0190447 A1* | 7/2010 | Agrawal | H04W 72/082 455/63.1 |

(Continued)

OTHER PUBLICATIONS

International Search Report and Written Opinion—PCT/US2013/048300—ISA/EPO—Sep. 17, 2013.

*Primary Examiner* — Farah Faroul
(74) *Attorney, Agent, or Firm* — Seyfarth Shaw LLP

(57) ABSTRACT

Parameters associated with an interfering downlink transmission may be determined at the UE or may be signaled to the UE from an eNodeB. The parameters may be actual parameters or hypothetical parameters. Based on the parameters, the UE may determine a metric that reflects an amount of interference cancelled from the interfering data channel transmission. The UE determines a quasi-clean channel state information and/or interference efficiency based on the parameters. The UE may transmit the quasi-clean CSI and/or the interference efficiency to the eNodeB.

24 Claims, 11 Drawing Sheets

(56) References Cited

U.S. PATENT DOCUMENTS

| | | |
|---|---|---|
| 2011/0085612 A1 | 4/2011 | Muraoka et al. |
| 2011/0249643 A1 | 10/2011 | Barbieri et al. |
| 2012/0087261 A1 | 4/2012 | Yoo et al. |
| 2012/0224499 A1 | 9/2012 | Yoo et al. |
| 2013/0077502 A1* | 3/2013 | Gainey .............. H04B 7/15578 |
| | | 370/252 |
| 2013/0142175 A1* | 6/2013 | Manssour ......... H04W 72/1252 |
| | | 370/336 |
| 2014/0018090 A1* | 1/2014 | Khoryaev et al. .......... 455/452.1 |
| 2014/0198680 A1* | 7/2014 | Siomina et al. ............... 370/252 |
| 2014/0362766 A1* | 12/2014 | Strait ............................ 370/328 |
| 2014/0362942 A1* | 12/2014 | Wood et al. ................... 375/267 |

* cited by examiner

CHANNEL STATE INFORMATION REPORTING FOR PARTIALLY CANCELLED INTERFERENCE

CROSS-REFERENCE TO RELATED APPLICATION

This application claims the benefit under 35 U.S.C. §119(e) to U.S. Provisional Patent Application No. 61/666,673 entitled "CHANNEL STATE INFORMATION REPORTING FOR PARTIALLY CANCELLED INTERFERENCE," filed on Jun. 29, 2012, the disclosure of which is expressly incorporated by reference herein in its entirety.

BACKGROUND

1. Field

Aspects of the present disclosure relate generally to wireless communication systems, and more particularly to reporting a metric for downlink interference cancellation.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

SUMMARY

Parameters associated with an interfering downlink transmission may be determined at the UE or may be signaled to the UE from an eNodeB. The parameters may be actual parameters or hypothetical parameters. Based on the parameters, the UE may determine a metric that reflects an amount of interference cancelled from the interfering data channel transmission. In one configuration, the UE determines quasi-clean channel state information based on the parameters. The quasi-clean channel state information refers to channel state information after the cancellation of the downlink interference from at least one eNodeB. The quasi-clean channel state information is distinguishable from clean channel state information, which corresponds to channels in subframes that are protected from interference through inter-cell interference coordination (ICIC). Unclean channel state information corresponds to channels in subframes that are not protected from interference through ICIC. Improvements from interference cancellation are not evaluated for unclean channel state information. In another configuration, the UE determines an interference efficiency based on the parameters. The interference cancellation efficiency refers to the amount of downlink interference the UE may cancel based on the parameters. The UE may transmit the quasi-clean CSI and/or the interference cancellation efficiency to the eNodeB.

In one aspect of the present disclosure, a method of wireless communication is presented. The method includes determining parameters associated with an interfering downlink transmission. The method also includes determining a metric that reflects an amount of interference cancelled from the interfering data channel transmission based on the parameters. The method further includes transmitting the metric to an eNodeB.

Another aspect of the present disclosure is directed to an apparatus including means for determining parameters associated with an interfering downlink transmission. The apparatus also includes means for determining a metric that reflects an amount of interference cancelled from the interfering data channel transmission based on the parameters. The apparatus further includes means for transmitting the metric to an eNodeB.

In yet another aspect of the present disclosure aspect, a computer program product for wireless communications in a wireless network having a non-transitory computer-readable medium is presented. The computer readable medium includes non-transitory program code recorded thereon which, when executed by the processor(s), causes the processor(s) to perform operations of determining parameters associated with an interfering downlink transmission. The program code also causes the processor(s) to determine a metric that reflects an amount of interference cancelled from the interfering data channel transmission based on the parameters. The program code further causes the processor(s) to transmit the metric to an eNodeB.

Another aspect of the present disclosure is directed to a wireless communication apparatus that includes a memory and a processor(s) coupled to the memory. The processor(s) is configured to determine parameters associated with an interfering downlink transmission. The processor(s) is also configured to determine a metric that reflects an amount of interference cancelled from the interfering data channel transmission based on the parameters. The processor(s) is further configured to transmit the metric to an eNodeB.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
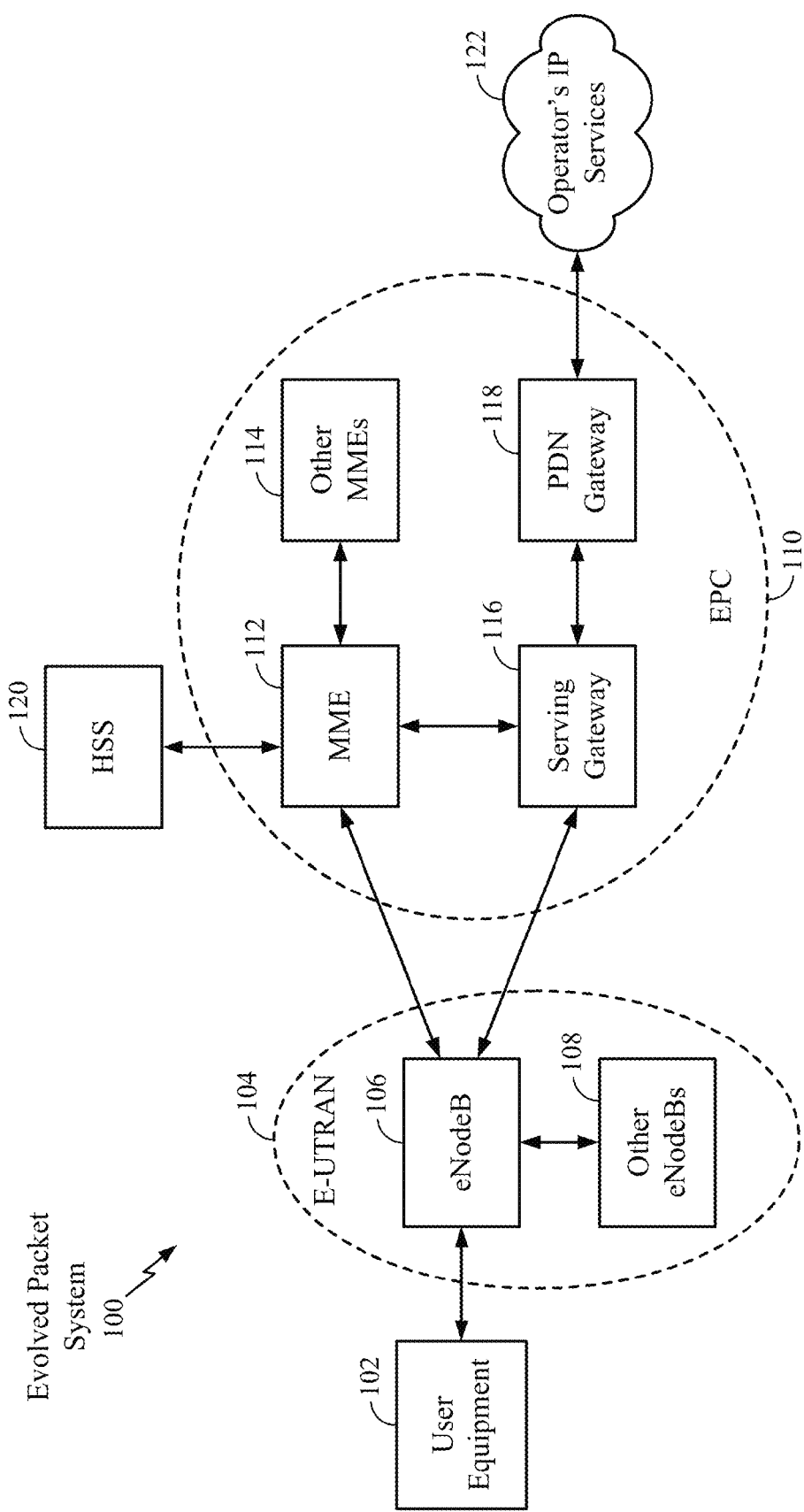
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol transmissions toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
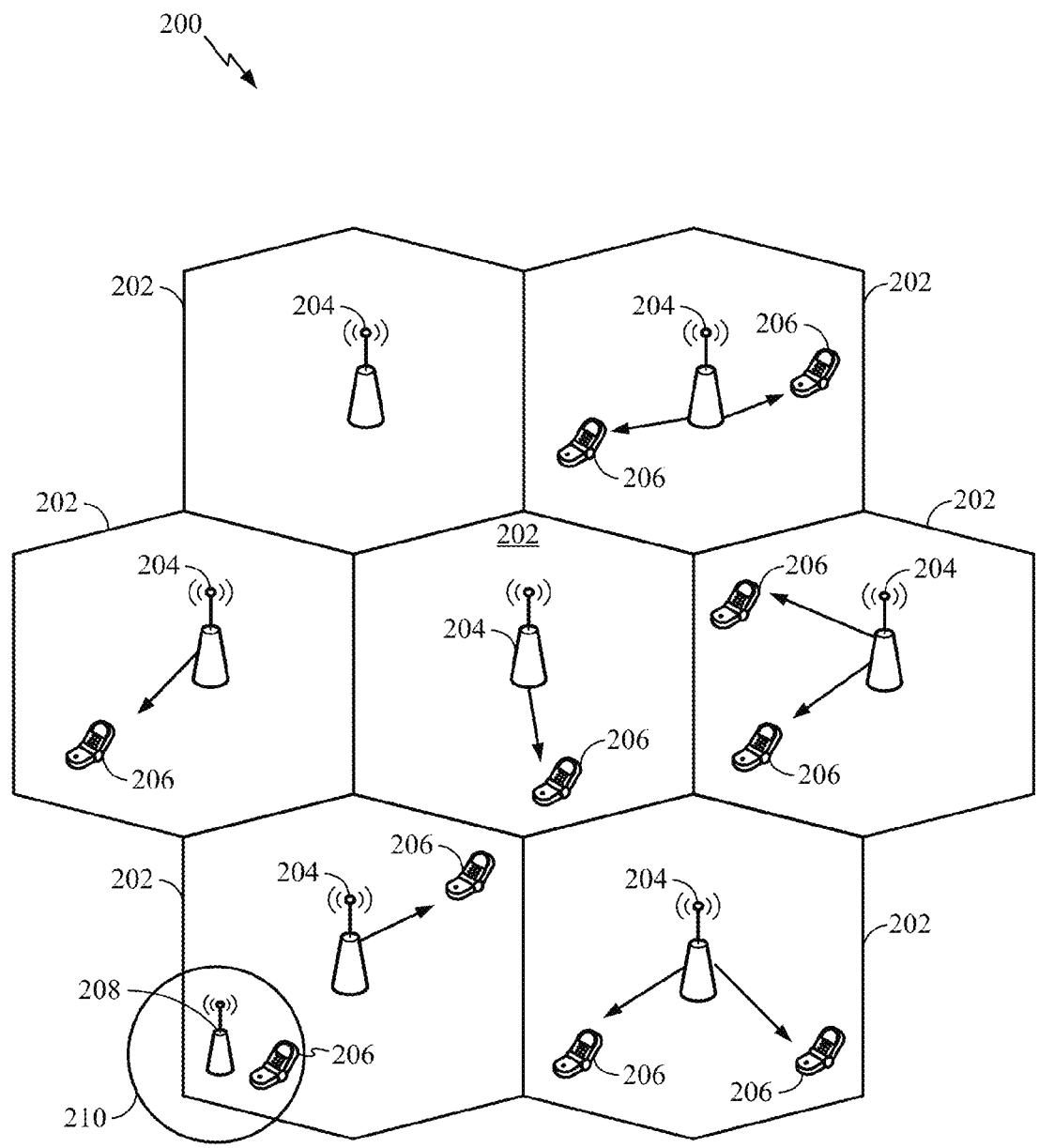
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be a remote radio head (RRH), a femto cell (e.g., home eNodeB (HeNB)), a pico cell, or a micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
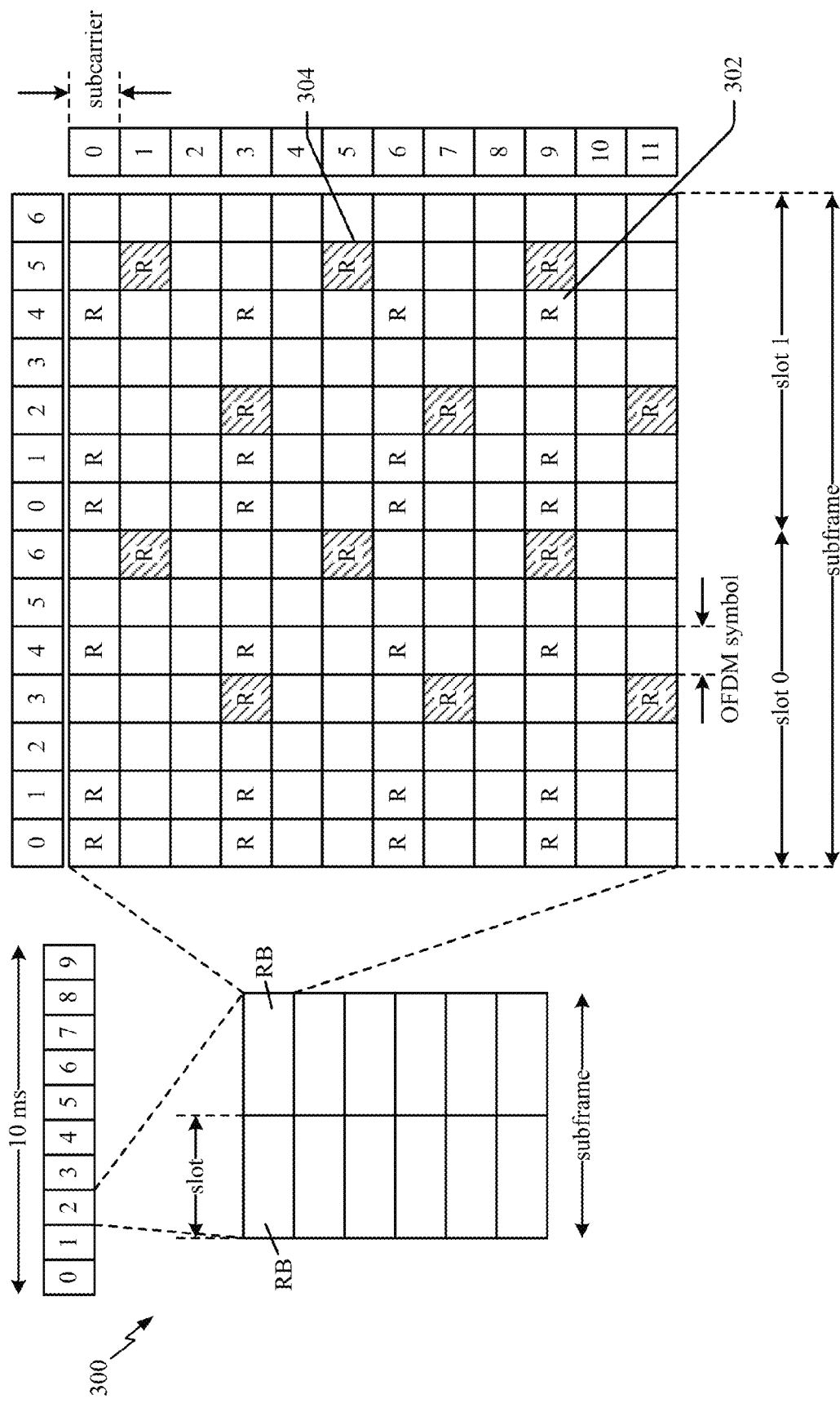
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, for a total of 84 resource elements. For an extended cyclic prefix, a resource block contains 6 consecutive OFDM symbols in the time domain, resulting in 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
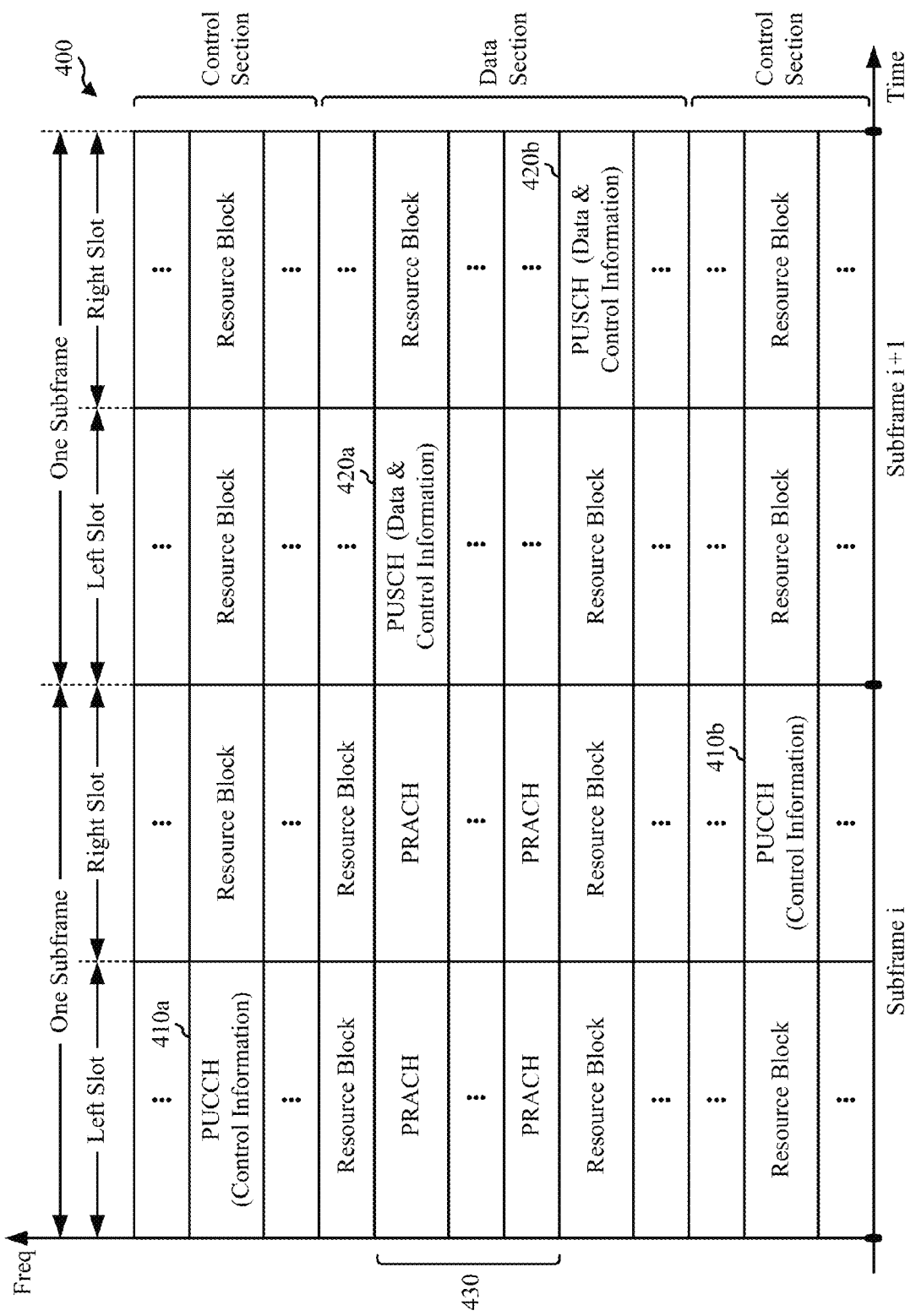
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
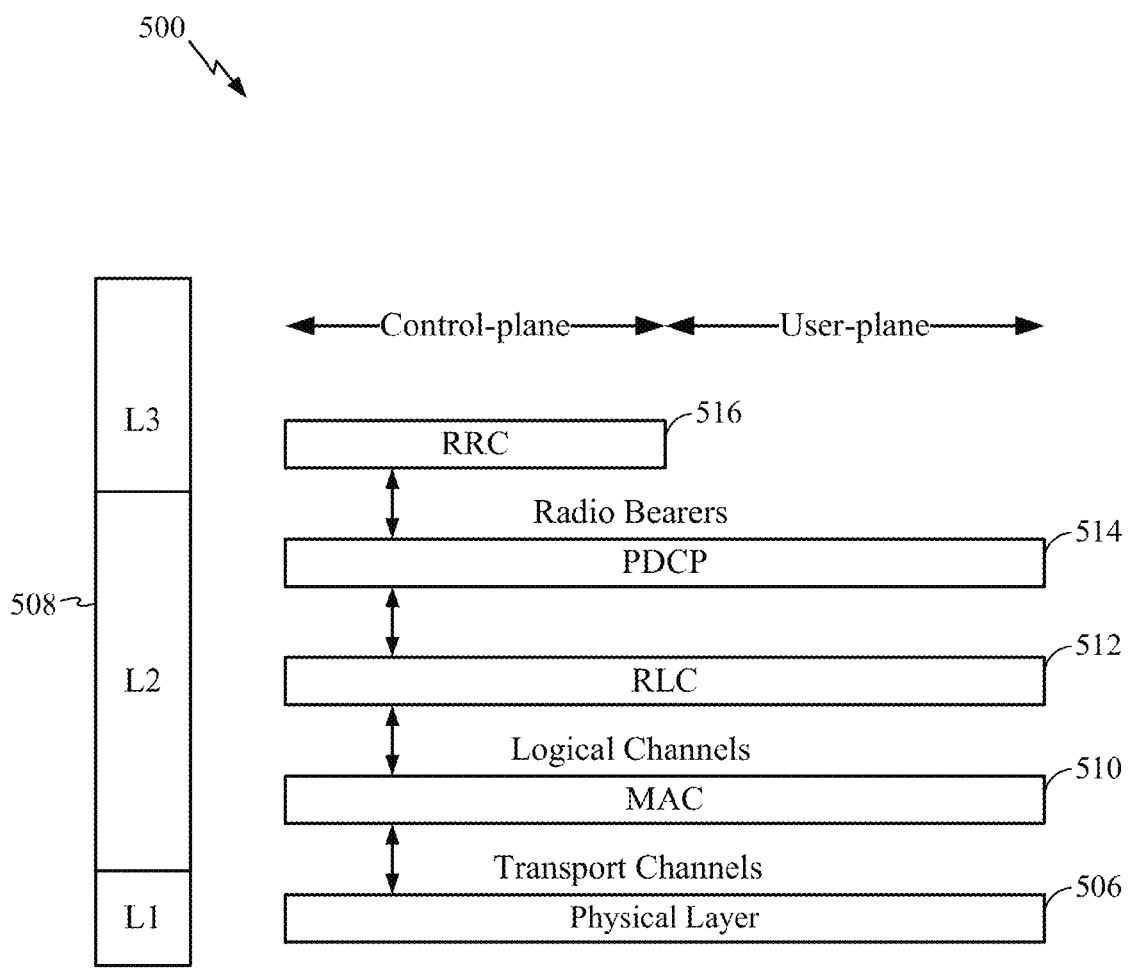
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
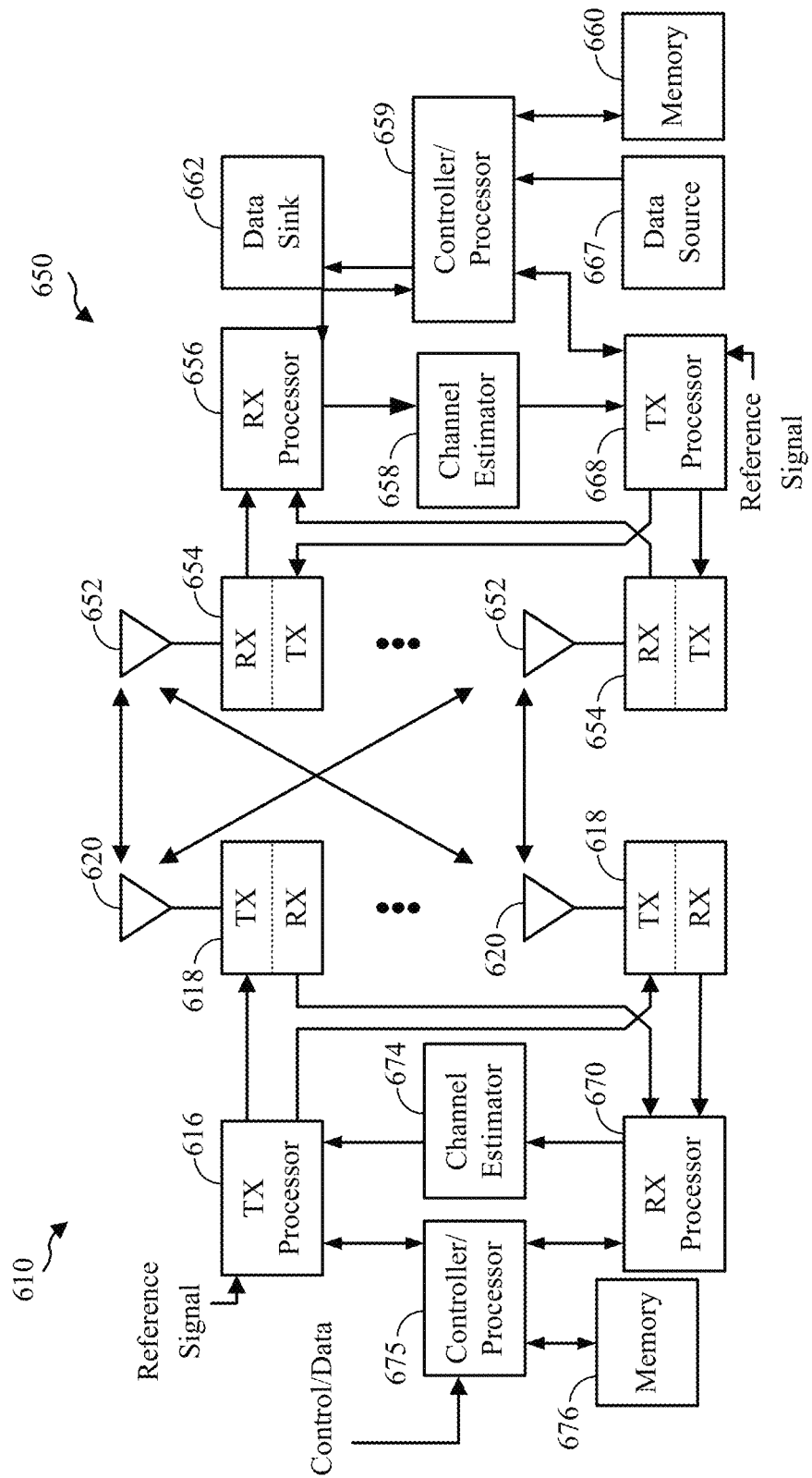
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

CQI Reporting with PDSCH-IC

In an LTE/LTE-A system, a user equipment (UE) may transmit channel state information (CSI) to the eNodeB to indicate the channel quality. The channel state information may include a channel quality indicator (CQI), a precoding matrix indicator (PMI), a rank indication (RI), and a subband index. The channel state information may also include information about the interference experienced at the UE.

Moreover, in an LTE/LTE-A system, the CQI is transmitted to the eNodeB to indicate a downlink transmission data rate (i.e., a Modulation and Coding Scheme (MCS) value). The CQI may be a 4-bit integer and may be based on the observed signal-to-interference-plus-noise ratio (SINR) at the UE. The CQI estimation process may also be based on the UE's capabilities, such as the number of antennas and the type of receiver used for detection. The UE's capabilities may be specified in determining the CQI because the MCS level that can be supported by a UE depends on the various UE capabilities. Additionally, the CQI may be used by the eNodeB for downlink scheduling and link adaptation.

When downlink channel interference cancellation, such as physical downlink shared channel interference cancellation (PDSCH-IC), is implemented at a receiver, such as a UE, the receiver should report a channel state information that reflects the results of the downlink channel interference cancellation operation. That is, the downlink interference information in the channel state information may indicate the amount of downlink interference that was cancelled via the physical downlink shared channel interference cancellation.

In enhanced inter cell interference coordination (eICIC)/ further eICIC (FeICIC) (e.g., LTE release 10), the eNodeB may configure the UE to report two sets of channel state information for the UE. One set of channel state information may report the channel state information on clean subframes (e.g., almost blank subframes (ABS) of the interferer). The channel state information on clean subframes may be referred to as clean channel state information. Another set of channel state information may report the channel state information on unclean subframes (e.g., non-ABS of the interferer). The channel state information on unclean subframes may be referred to as unclean channel state information.

Typically, a UE communicates with an eNodeB to inform the eNodeB of downlink interference. Furthermore, the eNodeB may estimate downlink interference via a downlink error rate. In some cases, the eNodeB and the UE may cooperate to mitigate the downlink interference. In one configuration, the eNodeB and the UE may mitigate the interference even when the interference is due to radios within the UE. Still, in a typical system, the downlink interference estimates may not be adequate to mitigate the interference.

Figure 7:
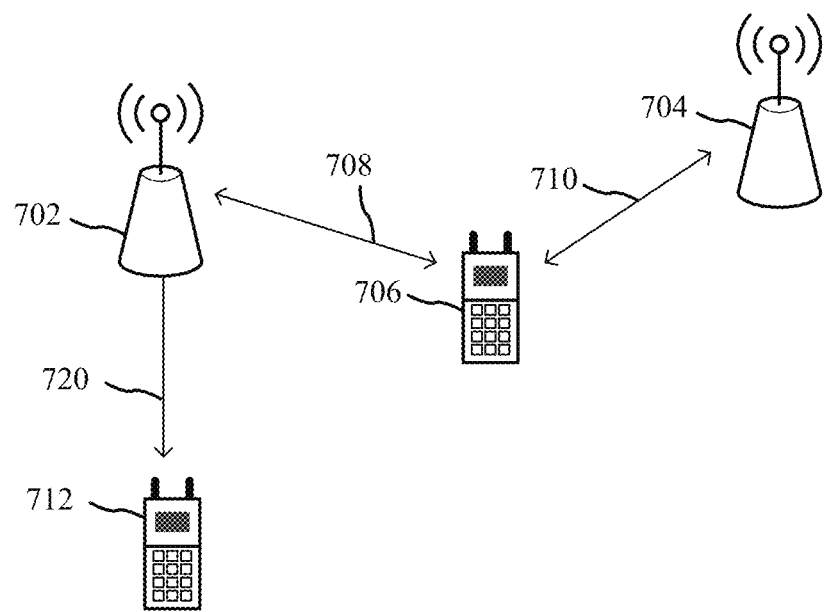
FIG. 7 is a diagram illustrating an exemplary wireless access network.

In some environments, such as the network of FIG. 7, a first UE 712 associated with a first eNodeB 702 may experience interference on the downlink 720. In some cases, the interference may be caused from transmissions 710 between the second UE 706 and a second eNodeB 704. In other cases, the interference may be caused by transmissions 708 between a second UE 706 and the first eNodeB 702.

In one configuration, the UE may cancel the downlink interference on non-ABS subframes when downlink channel interference cancellation, such as physical downlink shared channel interference cancellation, is implemented in the UE. Accordingly, as a result of the downlink interference cancellation, the UE may experience reduced interference on unclean subframes. That is, the quality of an unclean channel may improve as a result of the reduced downlink interference. For example, if there was little to zero downlink interference cancellation, the quality of an unclean channel would remain unchanged. Conversely, if the cancellation was perfect, the quality of the unclean channel would be equivalent to that of a clean channel.

The UE may only be able to partially cancel the downlink interference on unclean subframes with some level of cancellation quality. That is, when the UE cannot cancel all of the interference on a subframe, the quality of a resulting unclean channel may reflect the residual interference experienced on the unclean subframe after the interference cancellation. As the resulting channel quality for the subframe is neither clean nor unclean, it is desirable for the UE to communicate the resulting channel quality to the eNodeB. In the present disclosure, the channel quality that reflects the residual downlink interference after cancellation on an unclean channel is referred to as quasi-clean channel state information. When interference on an unclean channel is partially cancelled, the corresponding channel state information is referred to as quasi-clean channel state information. The aspects discussed below will be directed to computing and reporting quasi-clean channel state information.

When interference on an unclean subframe is partially cancelled, the amount of interference cancellation may depend on various parameters. This is because the UE's interference cancellation ability/quality may depend on these parameters. These parameters may include, but are not limited to, a received signal strength of the interfering signal, a number of dominant interfering signals, a spatial scheme of the interfering signal, a modulation order of the interfering signal, a code rate of the interfering signal, a resource block (RB) allocation of the interfering signal, and/or an algorithm used to cancel the interfering signal. The parameters may also include a transmission mode of the interfering signal. The transmission mode refers to whether the interfering signal is a user equipment specific-reference signal, such as a UE reference signal (UE-RS) or a cell-specific reference signal, such as a common reference signal (CRS). According to one configuration, the interfering signal is a downlink channel, such as the physical downlink shared channel (PDSCH).

According to one configuration, the parameters may be signaled to the UE from an eNodeB. The eNodeB may signal parameters that may or may not reflect the actual parameters associated with the interfering signal transmitted on the reference subframes on which the CSI is measured.

The parameters that do not reflect the actual parameters associated with the interfering signal parameters may be referred to as pseudo-parameters or hypothetical parameters. In another configuration, the parameters transmitted to the UE from the eNodeB may be actual parameters associated with the interfering signal parameters. Alternatively, according to another configuration, the parameters may be determined or estimated at the UE. In this configuration, the eNodeB does not signal the parameters to the UE. In one configuration, the UE selects pseudo-parameters and/or estimates pseudo-parameters based on specific criteria. The UE may transmit, to the eNodeB, the selected pseudo-parameters. In another configuration, the UE determines the actual parameters associated with the interfering signal transmitted on the reference subframe. When the actual parameters are not signaled to the UE, the UE may perform blind detection to determine the actual parameters. The UE may transmit, to the eNodeB, the blindly detected parameters.

As previously discussed, in one configuration, the UE determines the quasi-clean channel state information based on the pseudo-parameters. The pseudo-parameters may be the pseudo-parameters transmitted from the eNodeB and/or pseudo-parameters selected or estimated at the UE. In this configuration, the UE may not actually cancel the interference based on the pseudo-parameters. Rather, when the parameters are pseudo-parameters, the UE indirectly derives the quasi-clean channel state information without performing any actual interference cancellation. Thus, the UE may determine the amount of the interference that may be cancelled based on the pseudo-parameters.

The amount of interference that may be cancelled may be referred to as the interference cancellation quality. The UE reports the quasi-clean channel state information based on the determined interference cancellation quality. Specifically, the quasi-clean channel state information reflects the channel quality and the downlink interference cancellation. Furthermore, the UE may also report, to the eNodeB, the chosen pseudo-parameters and/or the estimated pseudo-parameters along with the quasi-clean channel state information.

In another configuration, the UE determines the quasi-clean channel state information based on the actual parameters. The actual parameters may be the parameters signaled to the UE and/or the actual parameters determined by the UE. In this configuration, the UE cancels the interference based on the actual parameters and determines the resulting quasi-clean channel state information.

Alternatively, in another configuration the UE may not actually cancel the downlink interference with the actual parameters. Rather, the UE may determine the amount of downlink interference that may be cancelled based on the actual parameters. In this configuration, the UE reports the quasi-clean channel state information based on the hypothetical downlink interference cancellation quality determined based on the actual parameters.

For downlink channel interference cancellation capable UEs, the UE may report the quasi-clean channel state information in addition to the clean channel state information and/or the unclean channel state information. According to one configuration, the eNodeB configures the reports to include quasi-clean channel state information in addition to clean channel state information and unclean channel state information. According to another configuration, the eNodeB configures the reports to include quasi-clean channel state information instead of the clean channel state information. Specifically, in this configuration, the UE only reports the unclean channel state information and the quasi-clean channel state information. According to yet another configuration, the eNodeB configures the reports to include the quasi-clean channel state information instead of the unclean channel state information. That is, in this configuration, the UE only reports the clean channel state information and the quasi-clean channel state information.

According to still another configuration, the reporting may be autonomously configured by the UE. For example, the UE may autonomously report quasi-clean channel state information instead of clean channel state information. Specifically, the UE only reports the unclean channel state information and the quasi-clean channel state information. According to another configuration, the UE may autonomously report the quasi-clean channel state information instead of the unclean channel state information. That is, the UE only reports the clean channel state information and the quasi-clean channel state information.

In one configuration, the UE may report one set of quasi-clean channel state information or multiple sets of quasi-clean channel state information. Each quasi-clean channel state information set is associated with a set of parameters. As previously discussed, the parameters may be pseudo parameters transmitted from an eNodeB or parameters selected or estimated by the UE. Furthermore, the parameters may be actual parameters transmitted from the eNodeB or actual parameters determined by the UE.

When the UE has multiple sets of quasi-clean channel state information to report, the UE may cycle through the sets of quasi-clean channel state information when reporting the quasi-clean channel state information along with the clean channel state information and/or the unclean channel state information. A different set of quasi-clean channel state information is reported in each reporting period. For example, as discussed above the eNodeB may configure the UE to report the quasi-clean channel state information and the unclean channel state information. Accordingly, when the UE has multiple sets of quasi-clean channel state information to report, the UE will report one of the quasi-clean channel state information and cycle through the set of quasi-clean channel state information during each reporting period so that a different quasi-clean channel state information is reported in the next period.

According to another configuration, instead of explicitly reporting the quasi-clean channel state information, the UE may report the interference cancellation efficiency. The interference cancellation efficiency refers to the amount of interference that would be cancelled based on the parameters. Specifically, the UE does not report the channel state information that includes both the channel quality indicator and the amount of downlink interference. Rather, the UE only reports the amount of interference that would be cancelled based on the parameters. The interference cancellation efficiency may be a value, such as a percentage.

The selection of the parameters and reporting may be similar to the previously discussed configurations. In one configuration, the parameters may be pseudo-parameters signaled from the eNodeB. In another configuration, the parameters may be actual parameters transmitted from the eNodeB. In still yet another configuration, the parameters may be pseudo-parameters selected or estimated by the UE. Finally, in another configuration, the parameters may be actual parameters determined by the UE.

Based on the downlink interference cancellation efficiency, the reference signal received power (RSRP), clean and unclean channel state information reported by the UE, the eNodeB may reconstruct the quasi-clean channel state information for the UE. Because the channel quality information with perfect and zero cancellation efficiency, respectively, is equal to the clean and unclean channel state information, the eNodeB may determine the quasi-clean channel state information based on the determined channel quality information or the reported cancellation efficiency.

Figure 8:
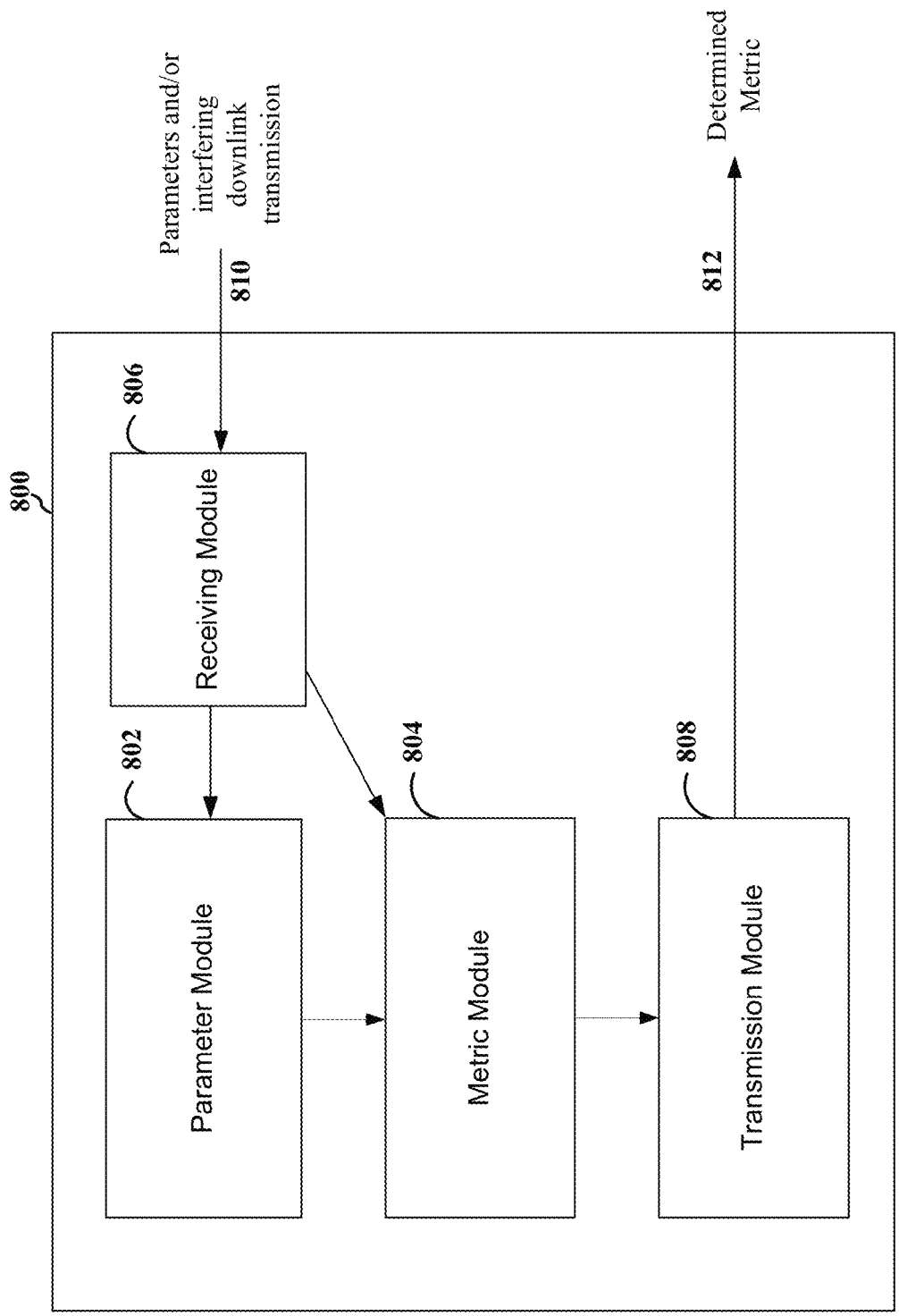
FIG. 8 is a conceptual data flow diagram illustrating the data flow between different modules/means/components in an exemplary apparatus.

FIG. 8 is a conceptual data flow diagram illustrating the data flow between different modules/means/components in an exemplary apparatus 800. The apparatus 800 includes a parameter module 802 that determines parameters associated with an interfering downlink transmission. In one configuration, the parameters may be received via a signal 810 that is received at the receiving module 806. In this configuration, the receiving module transmits the parameters to the parameter module 802. In another configuration, the parameters are determined at the parameter module 802.

The apparatus 800 also includes a metric module 804 that determines a metric that reflects an amount of interference cancelled from the interfering downlink transmission. In one configuration, the amount of interference cancelled is based on the parameters. The parameter module 802 may transmit the parameters to the metric module 804. Furthermore, the interfering downlink transmission may be determined via the signal 810 received at the receiving module 806. The receiving module 806 may transmit information for the interfering downlink transmission to the metric module 804.

The apparatus 800 transmits the metric using a signal 812 transmitted via the transmission module 808. Specifically, the metric module 804 may transmit the metric to the transmission module 808. The apparatus may include additional modules that perform each of the steps of the process in the aforementioned flow chart of FIG. 10. As such, each step in the aforementioned flow chart FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 9:
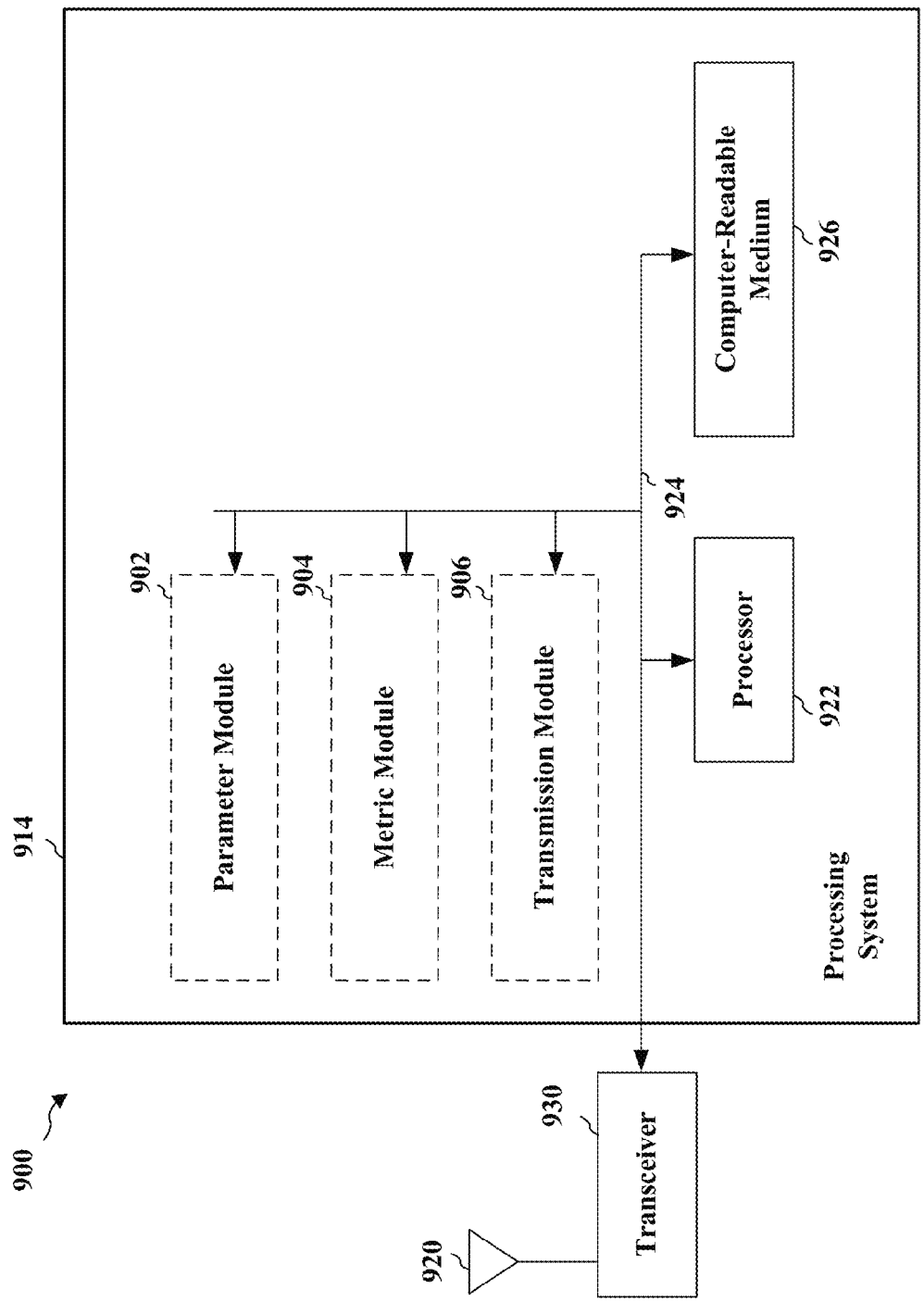
FIG. 9 is a block diagram illustrating different modules/means/components in an exemplary apparatus.

FIG. 9 is a diagram illustrating an example of a hardware implementation for an apparatus 900 employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 922 the modules 902, 904, 906 and the computer-readable medium 926. The bus 924 may also link various other circuits such as timing sources, peripherals, voltage regulators, and power management circuits, which are well known in the art, and therefore, will not be described any further.

The apparatus includes a processing system 914 coupled to a transceiver 930. The transceiver 930 is coupled to one or more antennas 920. The transceiver 930 enables communicating with various other apparatus over a transmission medium. The processing system 914 includes a processor 922 coupled to a computer-readable medium 926. The processor 922 is responsible for general processing, including the execution of software stored on the computer-readable medium 926. The software, when executed by the processor 922, causes the processing system 914 to perform the various functions described for any particular apparatus. The computer-readable medium 926 may also be used for storing data that is manipulated by the processor 922 when executing software.

The processing system 914 includes a parameter module 902 for determining parameters associated with an interfering downlink transmission. The processing system 914 also includes a metric module 904 for determining a metric that reflects an amount of interference cancelled from the interfering downlink transmission based at least in part on the parameters. The processing system 914 may further include a transmission module 906 for transmitting the metric. The modules may be software modules running in the processor 922, resident/stored in the computer-readable medium 926, one or more hardware modules coupled to the processor 922, or some combination thereof. The processing system 914 may be a component of the UE 650 and may include the memory 660, and/or the controller/processor 659.

Figure 10:
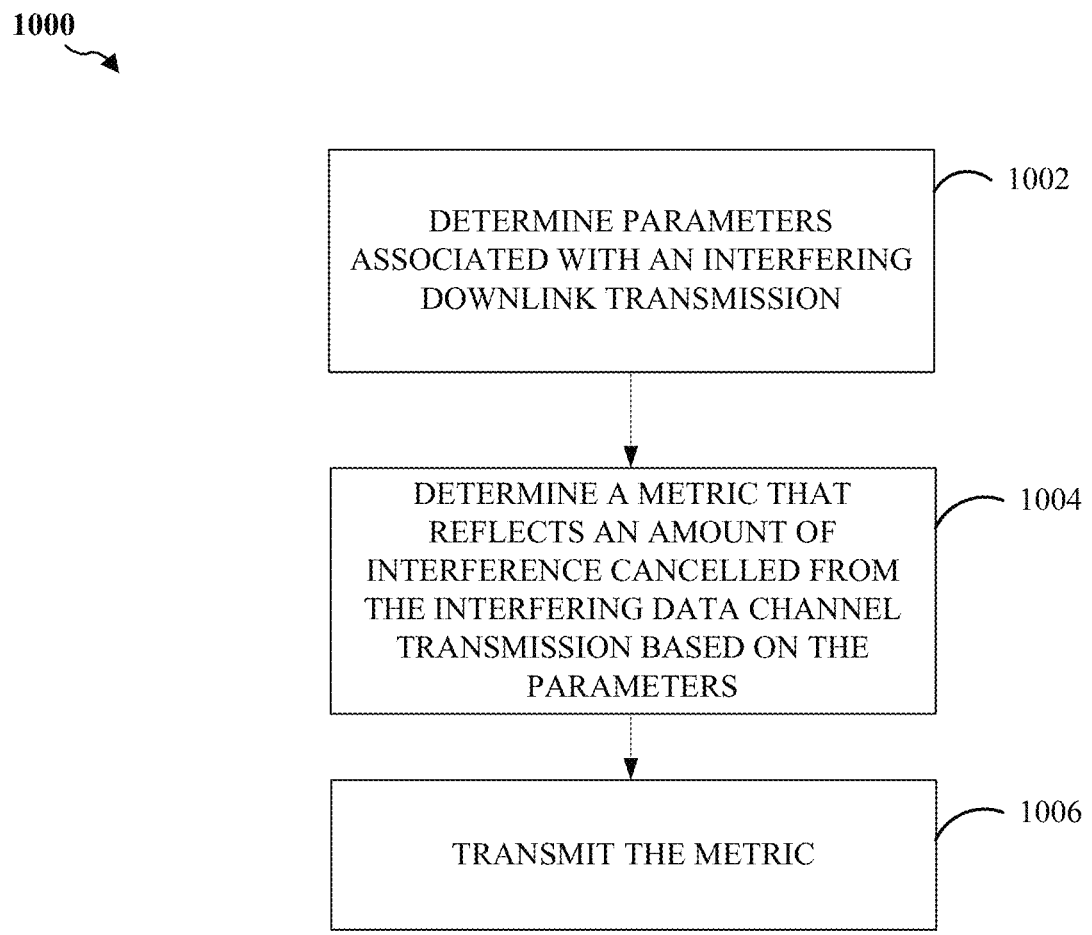
FIGS. 10 and 11 are block diagrams illustrating methods for determining a metric according to aspects of the present disclosure.

FIG. 10 illustrates a method 1000 for determining an amount of interference cancellation based on a parameter. In block 1002, a UE determines parameters associated with an interfering downlink transmission. In one configuration, the parameters are signaled to the UE from an eNodeB. In another configuration, the parameters are determined at the UE. The parameters may be hypothetical parameters or may be actual parameters. The parameters may include, but are not limited to, a received signal strength of the interfering signal, a number of dominant interfering signals, a spatial scheme of the interfering signal, a modulation order of the interfering signal, a code rate of the interfering signal, a resource block (RB) allocation of the interfering signal, and/or an algorithm used to cancel the interfering signal.

The UE determines a metric that reflects an amount of interference cancelled from the interfering downlink transmission in block 1004. The metric is determined based on the parameters. In one configuration, the metric is quasi-clean channel state information that includes a channel quality and reflects the amount of downlink interference that was cancelled. In another configuration, the metric is a cancellation efficiency that only reflects that amount of interference that is cancelled or may potentially be cancelled.

Furthermore, in block 1006, the UE transmits the metric. In one configuration, the UE transmits the metric in addition to transmitting the parameters determined at the UE.

Figure 11:
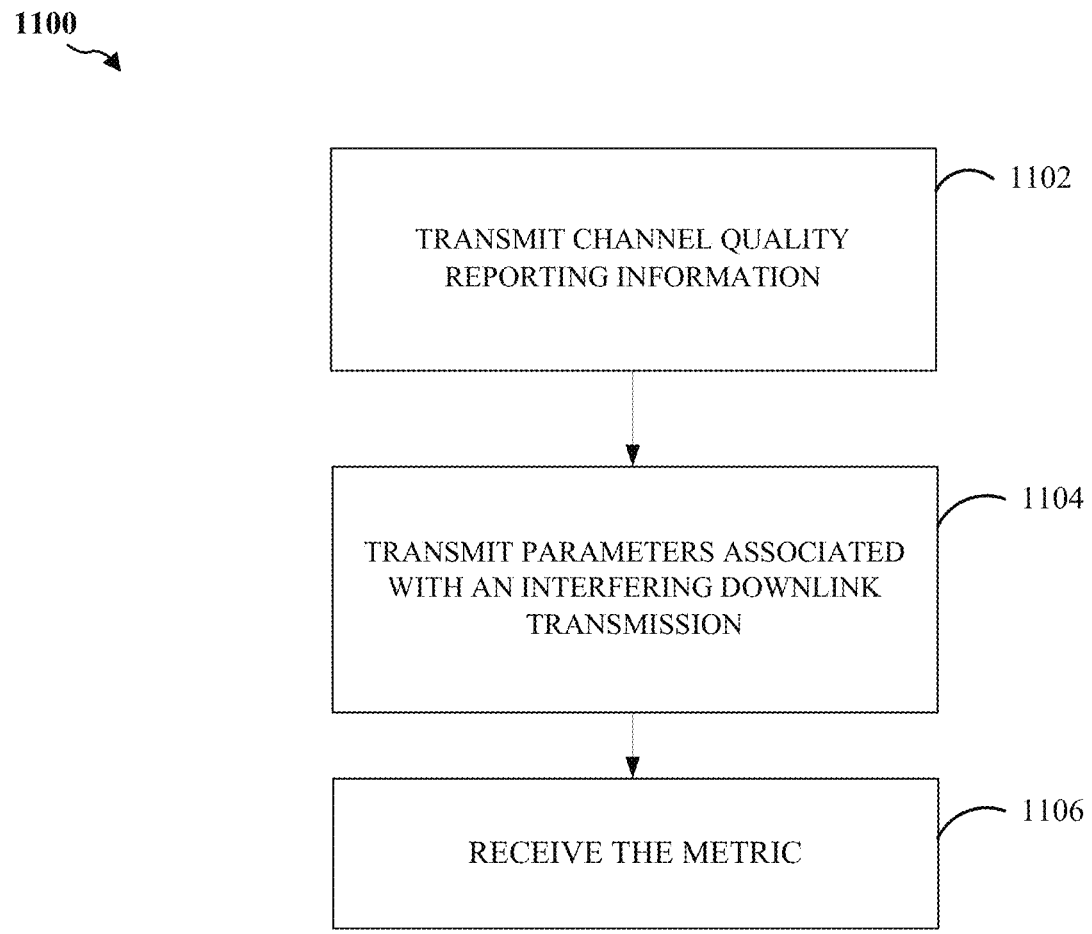

FIG. 11 illustrates a method 1100 for receiving an interference cancellation capability metric at an eNodeB. In block 1102, an eNodeB transmits channel quality reporting information to a UE. The channel quality reporting information may include a first set of subframes for reporting a metric and second set of subframes for reporting a metric. In one configuration, the first set of subframes are clean subframes and the second set of subframes are unclean subframes. In another configuration, the first set of subframes are clean subframes and the second set of subframes are quasi-clean subframes. In yet another configuration, the first set of subframes are unclean subframes and the second set of subframes are quasi-clean subframes.

Additionally, in block 1104 the eNodeB transmits parameters associated with an interfering downlink transmission to the UE. The parameters may be hypothetical parameters or may be actual parameters. The parameters may include, but are not limited to, a received signal strength of the interfering signal, a number of dominant interfering signals, a spatial scheme of the interfering signal, a modulation order of the interfering signal, a code rate of the interfering signal, a resource block (RB) allocation of the interfering signal, and/or an algorithm used to cancel the interfering signal.

Finally, in block 1106, the eNodeB receives the metric from the UE. The metric may correspond to an interference cancellation capability at the UE associated with the first set of subframes or the second set of subframes. The metric may include channel state information or an interference cancellation efficiency.

When the metric is the interference cancellation efficiency, the eNodeB may reconstruct the quasi-clean channel state information based on the interference cancellation efficiency, the reference signal received power (RSRP), clean and unclean channel state information reported by the UE.

In one configuration, the UE 650 is configured for wireless communication including means for determining. In one aspect, the determining means may be the controller/processor 659, memory 660, and/or receive processor 656 configured to perform the functions recited by the determining means. The UE 650 is also configured for wireless communication including means for transmitting. In one aspect, the transmitting means may be the controller/processor 659, transmit processor 668, modulators 654, and/or antenna 652 configured to perform the functions recited by the transmitting means. In another aspect, the aforementioned means may be any module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining, at a user equipment (UE), parameters associated with an interfering downlink transmission, the parameters enabling the UE to cancel interference from the interfering downlink transmission;
   determining, at the UE, a metric that reflects an amount of interference cancelled at the UE from an interfering data channel transmission based at least in part on the parameters; and
   transmitting, from the UE, the metric to an eNodeB.

2. The method of claim 1, further comprising receiving channel quality reporting information, the channel quality reporting information including a first set of subframes for reporting the metric and a second set of subframes for reporting the metric, the first set of subframes and the second set of subframes having different interference profiles.

3. The method of claim 2, in which:
   the first set of subframes are clean subframes and the second set of subframes are unclean subframes,
   the first set of subframes are clean subframes and the second set of subframes are quasi-clean subframes, or
   the first set of subframes are unclean subframes and the second set of subframes are quasi-clean subframes.

4. The method of claim 1, in which the metric is quasi-clean channel state information (CSI).

5. The method of claim 4, in which the quasi-clean CSI includes one or more of a channel quality indicator (CQI), the amount of interference from the interfering downlink transmission, a precoding matrix indicator (PMI), a rank indication (RI), a subband index, or a combination thereof.

6. The method of claim 4, in which the quasi-clean CSI includes a plurality of quasi-clean CSI sets, each quasi-clean CSI set being associated with a different set of parameters.

7. The method of claim 6, in which transmitting the metric further comprises reporting the metric at a plurality of reporting instances, and cycling through the plurality of quasi-clean CSI sets over the plurality of reporting instances.

8. The method of claim 1, in which the metric is an interference cancellation efficiency value.

9. The method of claim 1, in which the parameters are transmitted from the eNodeB or determined at the UE.

10. The method of claim 9, in which the parameters are associated with the interfering data channel transmission, and the parameters include actual parameters associated with the interfering data channel transmission, hypothetical parameters that are not the actual parameters associated with the interfering data channel transmission, or a combination thereof.

11. The method of claim 10, in which:
   the metric is indirectly determined based at least in part on hypothetical interference cancellation when the parameters are the hypothetical parameters, and
   the metric is directly determined based at least in part on actual interference cancellation when the parameters are the actual parameters.

12. A user equipment (UE) configured for wireless communications, comprising:
   a memory; and
   at least one processor coupled to the memory, the at least one processor being configured:
      to determine parameters associated with an interfering downlink transmission, the parameters enabling the UE to cancel interference from the interfering downlink transmission;
      to determine a metric that reflects an amount of interference cancelled at the UE from an interfering data channel transmission based at least in part on the parameters; and
      to transmit the metric to an eNodeB.

13. The UE of claim 12, in which the at least one processor is further configured to receive channel quality reporting information, the channel quality reporting information including a first set of subframes for reporting the metric and a second set of subframes for reporting the metric, the first set of subframes and the second set of subframes having different interference profiles.

14. The UE of claim 13, in which:
   the first set of subframes are clean subframes and the second set of subframes are unclean subframes,
   the first set of subframes are clean subframes and the second set of subframes are quasi-clean subframes, or
   the first set of subframes are unclean subframes and the second set of subframes are quasi-clean subframes.

15. The UE of claim 12, in which the metric is quasi-clean channel state information (CSI).

16. The UE of claim 15, in which the quasi-clean CSI includes one or more of a channel quality indicator (CQI), the amount of interference from the interfering downlink transmission, a preceding matrix indicator (PMI), a rank indication (RI), a subband index, or a combination thereof.

17. The UE of claim 15, in which the quasi-clean CSI includes a plurality of quasi-clean CSI sets, each quasi-clean CSI set being associated with a different set of parameters.

18. The UE of claim 17, in which the at least one processor is further configured to report the metric at a plurality of reporting instances, and to cycle through the plurality of quasi-clean CSI sets over the plurality of reporting instances.

19. The UE of claim 12, in which the metric is an interference cancellation efficiency value.

20. The UE of claim 12, in which the parameters are transmitted from the eNodeB or determined at the UE.

21. The UE of claim 20, in which the parameters are associated with the interfering data channel transmission, and the parameters include actual parameters associated with the interfering data channel transmission, hypothetical parameters that are not the actual parameters associated with the interfering data channel transmission, or a combination thereof.

22. The UE of claim 21, in which the at least one processor is further configured
   to indirectly determine the metric based at least in part on hypothetical interference cancellation when the parameters are the hypothetical parameters, and
   to directly determine the metric based at least in part on actual interference cancellation when the parameters are the actual parameters.

23. A user equipment (UE) for wireless communications, comprising:

means for determining parameters associated with an interfering downlink transmission, the parameters enabling the UE to cancel interference from the interfering downlink transmission;

means for determining a metric that reflects an amount of interference cancelled at the UE from an interfering data channel transmission based at least in part on the parameters; and means for transmitting the metric to an eNodeB.

24. A non-transitory computer-readable medium having program code recorded thereon, the program code comprising:

program code to determine, at a user equipment (UE), parameters associated with an interfering downlink transmission, the parameters enabling the UE to cancel interference from the interfering downlink transmission;

program code to determine, at the UE, a metric that reflects an amount of interference cancelled at the UE from an interfering data channel transmission based at least in part on the parameters; and program code to transmit the metric to an eNodeB.

* * * * *